United States Patent Office

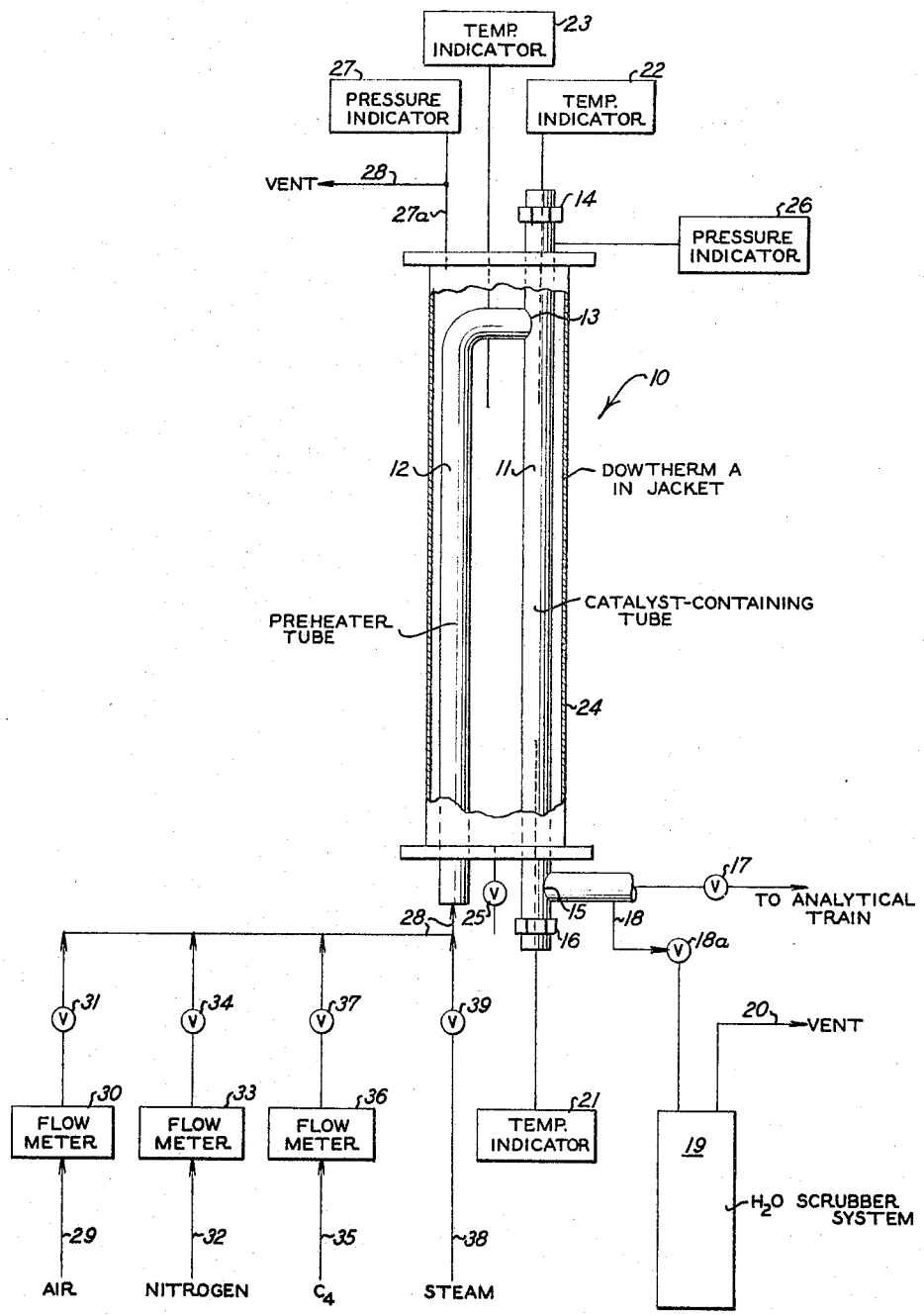

3,265,635
Patented August 9, 1966

---

3,265,635
OXIDATION CATALYST COMPRISING THE OXIDES OF COPPER, CHROMIUM, AND MOLYBDENUM
Robert S. Barker, Port Washington, N.Y., assignor to Halcon International Inc., a corporation of Delaware
Filed July 25, 1963, Ser. No. 297,534
5 Claims. (Cl. 252—437)

This invention relates to processes for the preparation of a lower acrolein from a corresponding lower olefin by catalytic oxidation in the vapor phase, and also to catalysts for use therein, more particularly to such a process and catalyst wherein the catalyst contains oxidized copper, molybdenum and chromium on a refractory support, and especially to such a process and catalyst wherein methacrolein is prepared from isobutylene over such a catalyst including phosphate and wherein the support is silicon carbide.

The lower acroleins such as acrolein itself and alpha-methacrolein are commercially important materials and several processes are known for their manufacture, however, these processes leave much to be desired as to the overall yield, ease of recovery, simplicity of operation, and the like. Accordingly, the art is confronted by the problem of providing these materials from readily available low cost raw materials in an even more economical and convenient manner than is currently possible.

The discoveries associated with the invention and relating to the solution of the above problems, and the objects achieved in accordance with the invention as set forth herein include the provision of:

A process for preparing a catalyst adapted for use in the catalytic vapor phase oxidation of isobutylene to methacrolein which process comprises preparing an aqueous ammoniacal solution of a copper halide, a molybdate and a chromate, impregnating a refractory material therewith, drying and then activating at a temperature in the range of about 400° to 500° C., for a time in the range of about 5 to 25 hours, the proportions being such that relative to a formula weight of copper as 1.0, the formula weight of molybdenum is in the range of 0.05 to 2.0 and the formula weight of chromium present is in the range of 0.05 to 2.0;

A catalyst adapted for use in the catalytic vapor phase oxidation of isobutylene to methacrolein, said catalyst comprising combined oxidized copper, molybdenum and chromium on a refractory support, the amount of combined mixture on the support being in the range of 1.0 to 20% by weight of the support, the ratio of ingredients in the mixture being such that relative to a formula weight of copper as 1.0, the formula weight of molybdenum is in the range of 0.05 to 2.0 and the formula weight of chromium present is in the range of 0.05 to 2.0;

Such a process wherein the initial mixture includes ammonium phosphate in an amount such that the content of phosphate in the final mixture is in the range of 5 to 25% based on the total catalyst weight exclusive of the support;

Such a catalyst including phosphorous, the amount of phosphorous being calculated as phosphate and being such that the content thereof is in the range of 5 to 25% based on the total catalyst weight exclusive of the support;

Such a catalyst comprising 10% of catalyst mixture on a medium porosity sicilon carbide support and comprising for one formula weight of copper, a formula weight of molybdenum of 1.0, and a formula weight of chromium of 1.0, 15% of the catalyst mixture being phosphate;

A process for the production of a lower acrolein from the corresponding lower olefin which process comprises passing a gaseous mixture comprising said olefin and oxygen into contact with a catalyst comprising combined oxidized copper, molybdenum and chromium on a refractory support, the amount of combined mixture on the support being in the range of 1.0 to 20% by weight of the support, the ratio of ingredients in the mixture being such that relative to a formula weight of copper as 1.0, the formula weight of molybdenum is in the range of 0.05 to 2.0 and the formula weight of chromium present is in the range of 0.05 to 2.0, the contact temperature being in the range of 150° to about 600° C., the pressure being in the range of about 1.0 to 15 atmospheres absolute and the space velocity being in the range of 500 to 4000/hour;

Such a process wherein isobutylene is converted to methacrolein at a temperature in the range of about 200° to 450° C.;

Such a process wherein the reaction mixture includes steam and the space velocity added by the latter is in the range of about 500 to 2000/hour;

Such a process wherein the catalyst includes phosphorous, the amount of phosphorous being calculated as phosphate and being such that the content thereof is in the range of 5 to 25% preferably 15%, based on the total catalyst weight exclusive of the support;

And other objects which will be apparent as details or embodiments of the invention are set forth hereinafter.

The accompanying drawing is a schematic illustration of one form of apparatus which is adapted for use in one embodiment of the invention.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

Example 1

Reference is made to the accompanying drawing for an illustration of the apparatus used in this example.

The reactor 10 consists of a vertical (4′ x 1″) carbon steel pipe 11 (with bottom cap 16) attached at 13 near the upper end to another (4′ x 3/8″) carbon steel pipe 12 to form an inverted U. The two tubes are set in an enclosed, electrically heated jacketed system 24 so that they can be heated by a liquid such as Dowtherm A, up to 360° C. (under about 80 p.s.i.g. pressure). The reactor tube is filled with catalyst (after removing cap 14) through the opening at the top. The exit tube 18 goes through valve 18a to a water scrubber 19 before venting via 20, and has a side T 17 and valve 17a for taking samples for analysis. Thermocouples 21, 22 and 23 are provided, as are pressure gauges 26 and 27 (connected via 26a and 27a respectively). The jacket is provided with drain valve 25.

The bottom of the preheater tube is provided with manifold 28 so that different substances can be fed to the reactor.

Air from a tank at 2000 p.s.i.g. is fed through line 29, a flowmeter 30 and valve 31 into the tube 28.

Nitrogen, when used to dilute the air and lower the oxygen concentration, is fed via line 32 through a flowmeter 33 and valve 34 to line 28.

Isobutylene taken from a cylinder (via line 35) is passed through flowmeter 36 and valve 37 to the tube 28.

Steam, when used, is fed as water through a metering pump and then through heating coils to convert the water to steam, which in turn passes through line 38 and valve 39 to the tube 28. The exit side of the steam coils may have a thermocouple to record the efficiency of the steam-producing apparatus. The manifold is held at 200° C., with the aid of an electrical heating ribbon to prevent condensation of steam in it.

A typical exit gas contains unreacted olefin, methacrolein, other carbonylic compounds, acids, carbon dioxide and carbon monoxide. Methacrolein and carbonylic materials (such as acetaldehyde and formaldehyde) and acids are caught in water scrubbers upon exiting from the reactor. Testing has shown that about 80–90% of all of the methacrolein is caught in the first two scrubbers and 10% of the first two amounts in the third; hence, practically all is collected in three scrubbers.

When amounts of carbonyl compounds are high a polarographic method is used to verify amounts of methacrolein. Gas chromatographic means can also be used.

Catalyst (approximately 300 cc.) is prepared by impregnating water solutions of metal salts on a support, generally porous silicon carbide, then evaporating the mixture to dryness up to 120° C., then placing the impregnated support in a muffle furnace overnight (15 hours) at 400° C. to 500° C.

As to terms used:

(a) Space velocity $$SV \text{ (hr.}^{-1}\text{) (25° C.)} = \frac{\text{total volume of gases through reactor (cc./hr.)}}{\text{volume of catalyst cc.}}$$

All gases taken at 25° C.

(b) Percent conversion $= \frac{\text{isobutylene (in.-out)}}{\text{total isobutylene in.}} \times 100$ (c) Percent selectivity $$= \frac{\text{mols methacrolein} \times 100}{\text{mols (total carbonyl} + \text{acid} + \frac{1}{4}(CO_2 + CO))}$$

Methacrolein is determined by polarograph; total carbonyl may be determined by hydroxylamine reagent; acid may be determined by titration to phenol phthalein endpoint; $CO_2$ may be determined by absorption in usual Ascarite; and CO may be determined by conversion to $CO_2$ in usual Hopcalite tube followed by absorption in Ascarite.

In the following examples, the catalyst used in the first seven is prepared by dissolving copper chloride in ammonia to form a solution, adding thereto ammonium molybdate, ammonium chromate, and ammonium phosphate. The resulting solution is mixed with irregular 4-mesh silicon carbide support and the support is impregnated as already described. The amount of impregnating materials used is such that for 100 grams of support, the added weight in the finished catalyst is 10 grams. The ratio of the materials used is such that for a formula weight of copper (Cu) as one, the formula weight of molybdenum (Mo) is 1.0, the formula weight of chromium (Cr) is 1.0, and the amount of phosphorous as phosphate ($PO_4$) is 15% based on the weight of the catalyst mixture on the support. In Example 8, a similar procedure is used, but no phosphate is included. In Example 9, a similar procedure is used, except that initially copper bromide is used instead of the chloride. In the second column, the air [a] contains 21% (vol.) $O_2$ and 79% $N_2$, the synthetic mixture [b] contains 8% $O_2$ and 92% $N_2$, and in the fourth column, the number in the parenthesis is the amount added by steam to the S.V.

| Example No. | Percent i-$C_4H_8$ in Air [a] or Synth. $O_2/N_2$ [b] | Temp., °C. | S.V. Hr.$^{-1}$ | Conv. Percent (Mol.) | Selectivity Percent (Mol.) Methacrolein |
|---|---|---|---|---|---|
| 1 | [b] 4.22 | 320 | 870(+545) | 21.3 | 56 |
| 2 | [b] 5.36 | 328 | 2,100(+1,090) | 11.6 | 53.8 |
| 3 | [b] 4.22 | 332 | 870(+545) | 24.8 | 52 |
| 4 | [a] 1.61 | 329 | 2,000 | 24.3 | 44 |
| 5 | [b] 4.22 | 327 | 870 | 18.0 | 53 |
| 6 | [a] 1.61 | 352 | 2,060(+545) | 36 | 34.8 |
| 7 | [b] 3.09 | 356 | 1,840(+545) | 40.1 | 48.5 |
| 8 | [a] 4.7 | 357 | 2,000 | 21.4 | 35 |
| 9 | [a] 1.54 | 342 | 2,160 | 55 | 43 |

Comparable results to the foregoing may be obtained with various modifications, including the following:

As to the catalyst composition, the metals or ingredients probably are in the form of the oxides, however, for convenience the proportions are indicated in terms of the element. Relative to formula weight of copper as 1.0, the molybdenum may be in the range of 0.05 to 2.0 formula weights, and the chromium content may be in the range of 0.05 to 2.0 formula weights; and the phosphorous content as phosphate may be in the range of 5 to 25% based on the total weight of catalyst mixture, exclusive of the support. The weight of catalyst mixture relative to the support may be in the range of 1.0 to 20%, preferably about 10% based on the weight of the support. Although medium porosity silicon carbide is a preferred support, other refractory support materials may be used, such as activated aluminum oxide, etched alumina, silica, Alundum, pumice, and the like. The carrier material may be in the form of pellets, lumps, granules, spheres, rings, or other formed pieces, or in other forms which may be of regular or irregular contour.

Generally, in carrying out the processes, the vapors of the olefin are contacted with the catalyst in the presence of oxygen containing gas at a suitable reaction temperature and pressure. The reaction temperature may be in the range of 150° to about 600° C., preferably about 200° to about 450° C. The particular temperature used depends upon the activity of the catalyst, the particular olefin treated, the space velocity, and the ratio of olefin to oxygen. The space velocity of the reaction mixture generally is in the range of about 500 to 4000/hour. If desired, steam may be included as a diluent and where so used the added space velocity contributed thereby may be in the range of 500 to 2000/hour. The temperature is controlled to obtain the desired degree of conversion of the olefin, and also of the highest selectivity of the converted olefin to the desired acrolein or substituted acrolein product.

Any apparatus suitable for vapor phase oxidation reactions may be used in the process. For a fixed bed operation, the catalyst may be packed in one or more elongated reaction tubes set within a temperature regulating bath or medium. One or more reaction zones may be used. The reactor may be heated to reaction temperature before or after the reaction mixture is introduced thereinto. If a series of reaction zones is used, all or only a part of one or more of the reactants may be introduced in the initial reaction mixture, the remainder being introduced at one or more spaced inlets downstream from the initial reaction zone.

The results obtained in accordance with the invention are indeed surprising, especially in view of the large number of materials tested as catalysts without satisfactory results. For example, copper oxide supported on copper spheres gives very low conversion, as does the same oxide on other supports such as silicon carbide or Aloxite. Molybdenum oxide in such a composition gives poor or unsatisfactory results. Copper or silver or both together on silicon carbide also give poor results. Poor results are also obtained with copper oxide together with oxidized molybdenum and silver on similar supports. Also, supported copper oxide with chromous oxide gives poor results. Poor results are also obtained with copper sulphate on silicon oxide; or bismuth, vanadium and molybdenum oxides on Aloxite; or stannous chloride and molybdenum and chromium oxides on silicon carbide; or bismuth, molybdenum and chromium oxides on silicon carbide.

The reaction may be carried out at substantially atmospheric pressure or somewhat above. The catalyst may be in fixed bed form, boiling bed form, or it may be in fluidized form.

Generally, the oxygen concentration in the initial reaction may be in the range of about 1 to 10 volume percent. The mol ratio of olefin to oxygen may be in the range of 2 to 1 to 30 to 1. The feed mixture may include inert diluents such as nitrogen, carbon dioxide, lower hydrocarbon, steam and the like. A general range of pressure may be in the range of about 1 to 15 atmospheres absolute. A preferred initial oxygen concentration is in the range of about 4 to 8 volume percent and a preferred initial olefin to oxygen ratio is in the range of 4 to 1 to 8 to 1.

The operating conditions may be such that there is about 20 to 60% conversion of the olefin per pass and the aldehyde selectivity is in the range of about 30 to 70%. Operating conditions are selected to give a maximum overall yield of the desired product.

Any convenient method may be used for recovering the product from the reaction gas mixture. The gas may be scrubbed with cold water or equivalent solvent to remove the desired aldehyde product, and this is subsequently recovered from the solvent by distillation or other suitable means.

Incompletely reacted feed materials may be recycled to the reaction step, or further processed in a subsequent reactor system with addition of one or more other reactants if needed. If desired, the mixture may be treated to remove by-products prior to further reacting; e.g. scrubbed with aqueous caustic to remove carbon dioxide and acids. Alternatively, the spent mixture may be scrubbed with a higher boiling hydrocarbon material to absorb unreacted olefin, after which the gas may be discarded. The absorbed olefin may be stripped from the solvent solution and reused in the feed to the reaction step.

Generally, the process is carried out in continuous manner, although semi-continuous operation is possible.

Although the advantages of the processes are particularly note-worthy when isobutylene is converted to methacrolein, analogous advantages are achieved therewith in the conversion of propylene to acrolein.

In view of the foregoing disclosures, variations and modifications thereof will be apparent to one skilled in the art, and it is intended to include within the invention all such variations and modifications except as do not come within the scope of the appended claims.

What is claimed is:

1. A catalyst adapted for use in the vapor phase oxidation of a lower olefin to a corresponding lower acrolein compound comprising the oxides of copper, molybdenum, and chromium, the proportions of said oxides being such that relative to a formula weight of copper as 1.0, the formula weight of molybdenum is in the range of 0.05 to 2.0 and the formula weight of chromium is in the range of 0.05 to 2.0, the catalyst being supported on a refractory material selected from the group consisting of silica, alumina, silicon carbide or pumice, the catalyst accounting for from 1.0% to 20% of the total weight of the catalyst and the support.

2. A catalyst according to claim 1 wherein the refractory material is selected from the group consisting of silicon carbide, aluminum oxide or silicon dioxide.

3. A catalyst according to claim 1 which contains from about 5% to about 25% phosphate based on the total catalyst weight exclusive of the support.

4. A catalyst adapted for the vapor phase oxidation of a member selected from the group consisting of propylene or isobutylene to the corresponding lower acrolein compound comprising the oxides of copper, molybdenum and chromium, and a phosphate, the proportions of said oxides being such that relative to a formula weight of copper as 1.0, the formula weights of molybdenum and chromium are each about 1.0, the catalyst being supported on a refractory material selected from the group consisting of silica, alumina, silicon carbide or pumice, the amount of phosphorus being about 15% based on the weight of the foregoing oxides exclusive of the support, the weight ratio of support to catalyst being about 10:1.

5. A process for preparing a catalyst for use in the vapor phase oxidation of a lower olefin to a corresponding lower acrolein compound which comprises preparing an aqueous ammoniacal solution of a copper halide, a molybdate and a chromate, impregnating a refractory support selected from the group consisting of silica, alumina, silicon carbide or pumice therewith, drying and then activating at a temperature in the range of about 400° C. to about 500° C. for from about 5 hours to about 25 hours thereby converting each of said metals to their oxides, the proportions being such that relative to a formula weight of copper as 1.0, the formula weight of molybdenum is from 0.05 to 2.0 and the formula weight of chromium is from 0.05 to 2.0.

References Cited by the Examiner

UNITED STATES PATENTS

| | | | |
|---|---|---|---|
| 1,889,672 | 11/1932 | Larson | 252—476 |
| 2,526,742 | 10/1950 | Gresham et al. | 260—586 |
| 2,627,527 | 2/1953 | Connolly | 260—604 |
| 2,670,380 | 2/1954 | Hadley | 260—604 |
| 2,773,838 | 12/1956 | Reid et al. | 252—437 |
| 2,810,763 | 10/1957 | Hadley | 260—604 |
| 2,855,370 | 10/1958 | Lundsted | 252—467 |
| 2,865,868 | 12/1958 | McKinley et al. | 252—467 |

OSCAR R. VERTIZ, *Primary Examiner.*

LEON ZITVER, MAURICE A. BRINDISI, BENJAMIN HENKIN, *Examiners.*

J. J. SETELIK, R. M. DAVIDSON, *Assistant Examiners.*